July 7, 1931.  L. E. LA BRIE  1,812,882
WHEEL
Filed Dec. 7, 1925
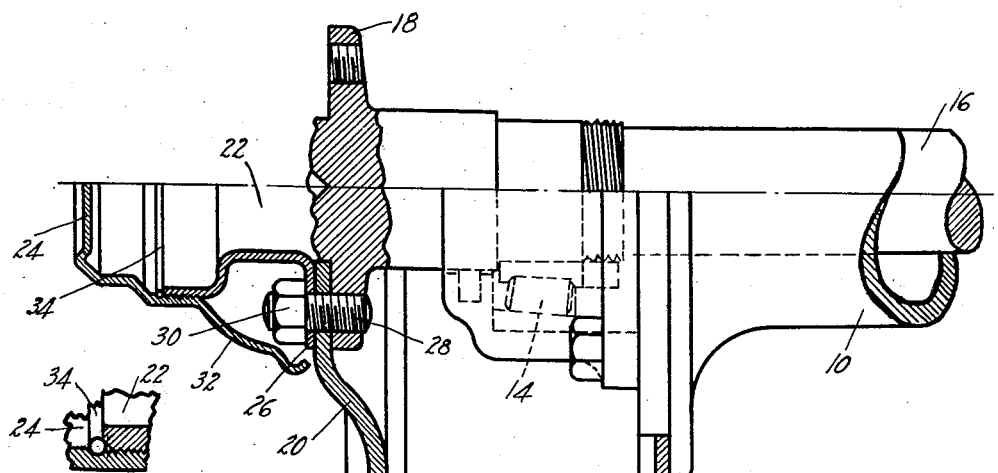
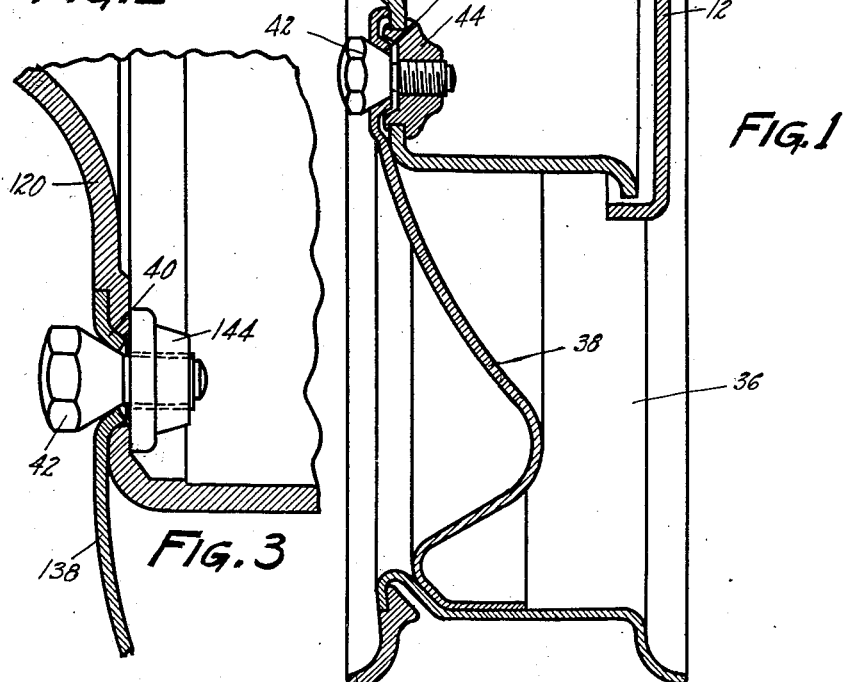
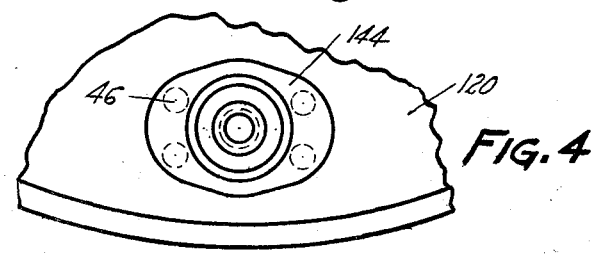
INVENTOR
LUDGER E. LA BRIE
BY
M. W. McConkey
ATTORNEY Patented July 7, 1931

1,812,882

UNITED STATES PATENT OFFICE

LUDGER E. LA BRIE, OF SOUTH BEND, INDIANA, ASSIGNOR TO MOTOR INDUSTRIES, INC., OF CHICAGO, ILLINOIS, A CORPORATION OF ILLINOIS

WHEEL

Application filed December 7, 1925. Serial No. 73,633.

This invention relates to wheels, and is illustrated as embodied in a disk wheel for an automobile.

One feature of the invention relates to novel means for securing an annular rim-carrying disk to a brake drum, or an equivalent inner wheel part. In one desirable arrangement, novel separate fittings secured to the drum are engaged by the wheel fastenings, which preferably have conical portions seated in conical flanges formed in the disk, and adapted to draw the flanges into sockets in the fittings or in the drum.

Other features of the invention relate to an arrangement of a hub cap carried by a novel stamping secured to the driving axle, and formed with a flaring skirt concealing the fastenings for the stamping and the wheel, and to other novel combinations of parts and desirable particular constructions which will be apparent from the following description of the illustrative embodiments shown in the accompanying drawings, in which:

Fig. 1 is a radial section through one-half of one form of wheel;

Fig. 2 is an enlarged view of a detail of Fig. 1;

Fig. 3 is a partial radial section through another wheel, showing a somewhat different embodiment of the novel wheel-fastening means; and Fig. 4 is a partial inside elevation of the wheel shown in Fig. 3, showing one of the fittings for the wheel fastenings.

In the arrangements illustrated, the wheel is intended for use as a rear wheel, a semi-floating axle being shown. The axle includes a housing 10 carrying the backing plate 12 of a brake, and receiving in its end an anti-friction bearing 14 for a live axle 16 projecting from the end of the housing and terminating in a rabbeted driving flange 18. A brake drum 20 forms the inner part or section of the wheel, and has its inner edge seated in the rabbet in flange 18.

A tubular drawn part or stamping 22 is threaded to receive a hub cap 24, and has an end flange 26 superposed on the inner edge portion of wheel part or brake drum 20. Threaded studs or other fastenings 28 pass through flanges 18 and 26 and wheel part 20, the nuts 30 clamping these parts together being concealed by a skirt 32 formed on the hub cap 24. A snap ring 34 seated in a groove in hub cap 24 engages the end of stamping 22 and insures that skirt 32 will not actually scrape against wheel section 20.

Rim 36 of the wheel is riveted or welded or otherwise secured to an outer annular disk or wheel section 38. Disk 38 engages the outer corner or edge of drum 20, is then turned outwardly and thence radially inwardly in parallel relation to the drum and is provided at its edge with a flange portion extending inwardly at right angles to the drum. The inwardly extending flange portion of the disk preferably seats upon a shoulder in the drum periphery defined by an inwardly pressed annular extending portion therein, as clearly disclosed in Figure 1 of the drawings. Two spaced zones of support for the disk are thus provided, the disk and drum portion intermediate said zones being spaced as disclosed. Between these two zones of support for disk 38 are arranged openings surrounded by conical flanges 40, in each of which is seated a conical portion of the head of a fastening 42. Each fastening 42 is threaded into a novel fitting 44, in the form of a casting or forging received in an opening in the head of drum 20, a flange of the fitting being spun over outside the drum to rivet the fitting to the drum.

In the arrangement of Figs. 3 and 4, the drum 120 is rabbeted about its outer edge to receive the inner portion of disk 138, and fastenings 42 draw conical flanges 40 directly into correspondingly shaped openings in drum 120, the fastenings being threaded into fittings 144 riveted or spot-welded or otherwise secured to the drum. The rabbeted portion of the drum is preferably shaped to define a flat ledge in its base to support the correspondingly shaped disk which, when superposed upon the rabbeted drum, presents an uninterrupted, smooth outer wheel face as disclosed. In the illustrated arrangement there are four spot-welds 46 for each fitting. Drum 120 is preferably a casting, whereas drum 20 may be drawn or stamped from sheet metal.

While two illustrative embodiments have been described in detail, it is not my intention to limit the scope of the invention to those particular embodiments, or otherwise than by the terms of the appended claim.

I claim:

A wheel comprising, in combination, an inner part having openings spaced angularly about its outer edge, an outer part contacting with the inner part along two circular lines, the annular portion between said circular lines forming an annular recess in said outer part, conical flanges formed within said annular recess opposite each of said openings, bushings in said openings having parts formed with conical recesses extending into said annular recess for cooperation with said conical flanges, and fastening means having conical portions seated in said flanges and forcing the two parts of the wheel together.

In testimony whereof, I have hereunto signed my name.

LUDGER E. LA BRIE.